United States Patent
Kuroda et al.

(10) Patent No.: US 6,561,295 B1
(45) Date of Patent: May 13, 2003

(54) CONTROL SYSTEM AND METHOD OF HYBRID VEHICLE

(75) Inventors: Shigetaka Kuroda, Wako (JP); Teruo Wakashiro, Wako (JP); Kazutomo Sawamura, Wako (JP); Atsushi Izumiura, Wako (JP); Atsushi Matsubara, Wako (JP); Shinichi Kitajima, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/692,306

(22) Filed: Oct. 20, 2000

(30) Foreign Application Priority Data

Oct. 29, 1999 (JP) .......................... 11-310349

(51) Int. Cl.⁷ ................................. B60K 1/00
(52) U.S. Cl. ............... 180/65.2; 180/65.3; 180/65.1; 180/65.4; 180/65.8
(58) Field of Search ................. 180/65.1, 65.2, 180/65.3, 65.4, 65.8

(56) References Cited

U.S. PATENT DOCUMENTS

| | | | | |
|---|---|---|---|---|
| 4,313,080 A | * | 1/1982 | Park ....................... 180/65.2 X |
| 5,115,183 A | * | 5/1992 | Kyoukane et al. ......... 180/65.2 |
| 5,125,469 A | * | 6/1992 | Scott ...................... 180/65.2 |
| 5,346,970 A | * | 9/1994 | Severinsky ............... 180/65.6 |
| 5,495,906 A | * | 3/1996 | Furutani .................. 180/65.2 |
| 5,608,308 A | * | 3/1997 | Kiuchi et al. ............. 180/65.6 |
| 5,656,921 A | * | 8/1997 | Farrall .................... 180/65.2 |
| 5,713,425 A | * | 2/1998 | Buschhaus et al. ........ 180/65.2 |
| 5,713,814 A | * | 2/1998 | Hara et al. ............... 180/65.2 |
| 5,722,502 A | * | 3/1998 | Kubo ..................... 180/65.2 |
| 5,865,263 A | * | 2/1999 | Yamaguchi et al. ....... 180/65.2 |

FOREIGN PATENT DOCUMENTS

JP   07-123509   5/1995

* cited by examiner

*Primary Examiner*—Frank Vanaman
*Assistant Examiner*—Brian L Swenson
(74) *Attorney, Agent, or Firm*—Armstrong, Westerman & Hattori, LLP

(57) ABSTRACT

A control system and method applied to a hybrid vehicle by which an excessive decrease of the remaining battery charge can be prevented while driving in a traffic jam. In the method, the remaining battery charge of the battery device is detected; and whether the vehicle is driving in a traffic jam is determined; and the charging device is made to charge the battery device if the detected remaining battery charge of the battery device is below a first predetermined value, and if it is determined that the vehicle is driving in a traffic jam.

14 Claims, 8 Drawing Sheets

CONTROL SYSTEM AND METHOD OF HYBRID VEHICLE

BACKGROUND OF THE INVENTION

1. Field of the Invention

The present invention relates to a control system and method of a hybrid vehicle which is driven by an engine and an electric motor, and in particular, to a system and a method for preventing a decrease of the remaining battery charge while driving in a traffic jam.

2. Description of the Related Art

Conventionally, a hybrid vehicle having not only an engine but also an electric motor as the drive source is known.

As a hybrid vehicle, a parallel hybrid vehicle is known that uses an electric motor as an auxiliary drive source for assisting the engine output. In the parallel hybrid vehicle, typically, operation of the engine is assisted using the electric motor during the accelerating operation, while during the decelerating operation, the battery and the like are charged via a regenerating operation, that is, "deceleration regeneration" is performed. According to various control operations including the above, the remaining battery charge (called a "SOC (state of charge)", hereinafter) of the battery is maintained while also satisfying the driver's demands. An example thereof is disclosed in Japanese Unexamined Patent Application, First Publication, No. Hei 7-123509.

When such a conventional parallel hybrid vehicle drives at a medium or high speed, sufficient regeneration energy can be obtained during deceleration. However, if the vehicle repeatedly starts and stops at a low vehicle speed, problems relating to the power management may occur.

That is, when the vehicle repeatedly starts and stops, decelerating operation starts before the vehicle speed becomes sufficiently high; thus, sufficient regeneration energy cannot be stored. During a traffic jam or the like in which each vehicle has to repeatedly start and stop at a low vehicle speed, sufficient charge (obtained by deceleration regeneration) cannot be obtained.

SUMMARY OF THE INVENTION

In consideration of the above circumstances, an objective of the present invention is to provide a control system and method applied to a hybrid vehicle, by which an excessive decrease of the remaining battery charge can be prevented while driving in a traffic jam.

Therefore, the present invention provides a control system of a hybrid vehicle, wherein:

said hybrid vehicle comprises:
  an engine (for example, an engine E in the following embodiment) and a motor (for example, an motor M in the following embodiment) for outputting force for driving the vehicle;
  a battery device (for example, a battery 3 in the following embodiment); and
  a charging device (for example, the motor M in the following embodiment) for charging the battery device, and said control system comprising:
  a remaining battery charge detecting section (for example, a battery ECU 31 in the following embodiment) for detecting the remaining battery charge (for example, remaining battery charge QBAT in the following embodiment) of the battery device;
  a traffic-jam drive determining section for determining whether the vehicle is driving in a traffic jam (refer to step S105 in the following embodiment); and
  a control section for making the charging device charge the battery device if the remaining battery charge of the battery device, detected by the remaining battery charge detecting section, is below a first predetermined value (for example, un upper limit #QBJAM in the following embodiment), and if it is determined by the traffic-jam drive determining section that the vehicle is driving in a traffic jam.

The present invention also provides a control method of a hybrid vehicle having the above structure, comprising the steps of:

detecting the remaining battery charge of the battery device;
  determining whether the vehicle is driving in a traffic jam; and making the charging device charge the battery device if the detected remaining battery charge of the battery device is below a first predetermined value, and if it is determined that the vehicle is driving in a traffic jam.

Accordingly, while the battery device is charged, no power is supplied to the motor, so that it is possible to prevent an excessive decrease of the remaining battery charge of the battery device.

In a typical example, the traffic-jam drive determining section comprises:

a maximum speed detecting section (for example, an FIECU 11 in the following embodiment) for detecting a maximum vehicle speed during a single driving operation (or movement) from the vehicle start to stop (for example, a maximum vehicle speed DRVMAX in the following embodiment); and
  a throttle opening-degree detecting section (for example, a throttle opening-degree sensor S6 in the following embodiment) for detecting a degree of throttle opening (for example, the degree of throttle opening TH in the following embodiment) of the engine, and
  the traffic-jam drive determining section determines that the vehicle is driving in a traffic jam if the maximum vehicle speed during a single driving operation is equal to or below a predetermined value (for example, an upper limit vehicle speed #VJAMST in the following embodiment), and if the degree of throttle opening is equal to or below a predetermined value (for example, an upper limit degree #THJAM in the following embodiment).

Similarly, the step, of determining whether the vehicle is driving in a traffic jam may comprise the steps of:

detecting a maximum vehicle speed during a single driving operation from the vehicle start to stop;
  detecting a degree of throttle opening of the engine; and
  determining that the vehicle is driving in a traffic jam if the maximum vehicle speed during a single driving operation is equal to or below a predetermined value, and if the degree of throttle opening is equal to or below a predetermined value.

Accordingly, if it is determined that the vehicle is driving in a traffic jam as described above, and if the remaining battery charge of the battery device is below the first predetermined value, the battery device is charged and thus it is possible to prevent an excessive decrease of the battery device.

In another typical example, the traffic-jam drive determining section comprises:

a maximum speed detecting section for detecting a maximum vehicle speed during a single driving operation from the vehicle start to stop, and the traffic-jam drive determining section determines that the vehicle is driving in a traffic jam if the maximum vehicle speed during a single driving operation is equal to or below a predetermined value, and if the remaining battery charge of the battery device, detected by the remaining battery charge detecting section, is equal to or below a second predetermined value (for example, remaining battery charge #QBJAMST in the following embodiment) which is smaller than the first predetermined value.

Similarly, the step of determining whether the vehicle is driving in a traffic jam may comprises the steps of:

detecting a maximum vehicle speed during a single driving operation from the vehicle start to stop; and determining that the vehicle is driving in a traffic jam if the maximum vehicle speed during a single driving operation is equal to or below a predetermined value, and if the detected remaining battery charge of the battery device is equal to or below a second predetermined value which is smaller than the first predetermined value.

According to the above conditions, it can be determined that the remaining battery charge of the battery device has been excessively consumed regardless of the degree of throttle opening, and the battery device can be immediately charged, thereby much more reliably preventing an excessive decrease of the remaining battery charge.

After it is determined that the vehicle is driving in a traffic jam according to any method as explained above, the traffic-jam drive determination may be released if the vehicle speed becomes equal to or above a predetermined value, or if the vehicle speed is below a predetermined value and the degree of throttle opening becomes equal to or above a predetermined value. Accordingly, the traffic-jam drive determination can be quickly released immediately after it is determined that the vehicle has been escaped from the traffic jam.

In the above structure, preferably, the motor also functions as the charging device, and the battery device stores energy generated using the motor as a generator driven by the engine, and energy regenerated via a regenerating operation performed by the motor when the vehicle is decelerating. In this case, the operation of charging the battery device can be reliably performed because the motor which functions as the charging device stops the original motor operation. In addition, the space in the engine room can be effectively used.

In addition, the control section may prohibit or restrict the operation of outputting force by the motor if the remaining battery charge is below the first predetermined value, and if it is determined that the vehicle is driving in a traffic jam.

Similarly, in the control method, the operation of outputting force by the motor may be prohibited or restricted if the remaining battery charge is below the first predetermined value, and if it is determined that the vehicle is driving in a traffic jam.

Furthermore, the control section may set the amount of the charge performed by the charging device to a high charge level if the remaining battery charge is below the first predetermined value, and if it is determined that the vehicle is driving in a traffic jam.

Similarly, in the control method, the amount of the charge performed by the charging device may be set to a high charge level if the remaining battery charge is below the first predetermined value, and if it is determined that the vehicle is driving in a traffic jam.

DESCRIPTION OF THE PREFERRED EMBODIMENTS

Hereinafter, an embodiment of the present invention will be explained referring to the figures.

Figure 1:
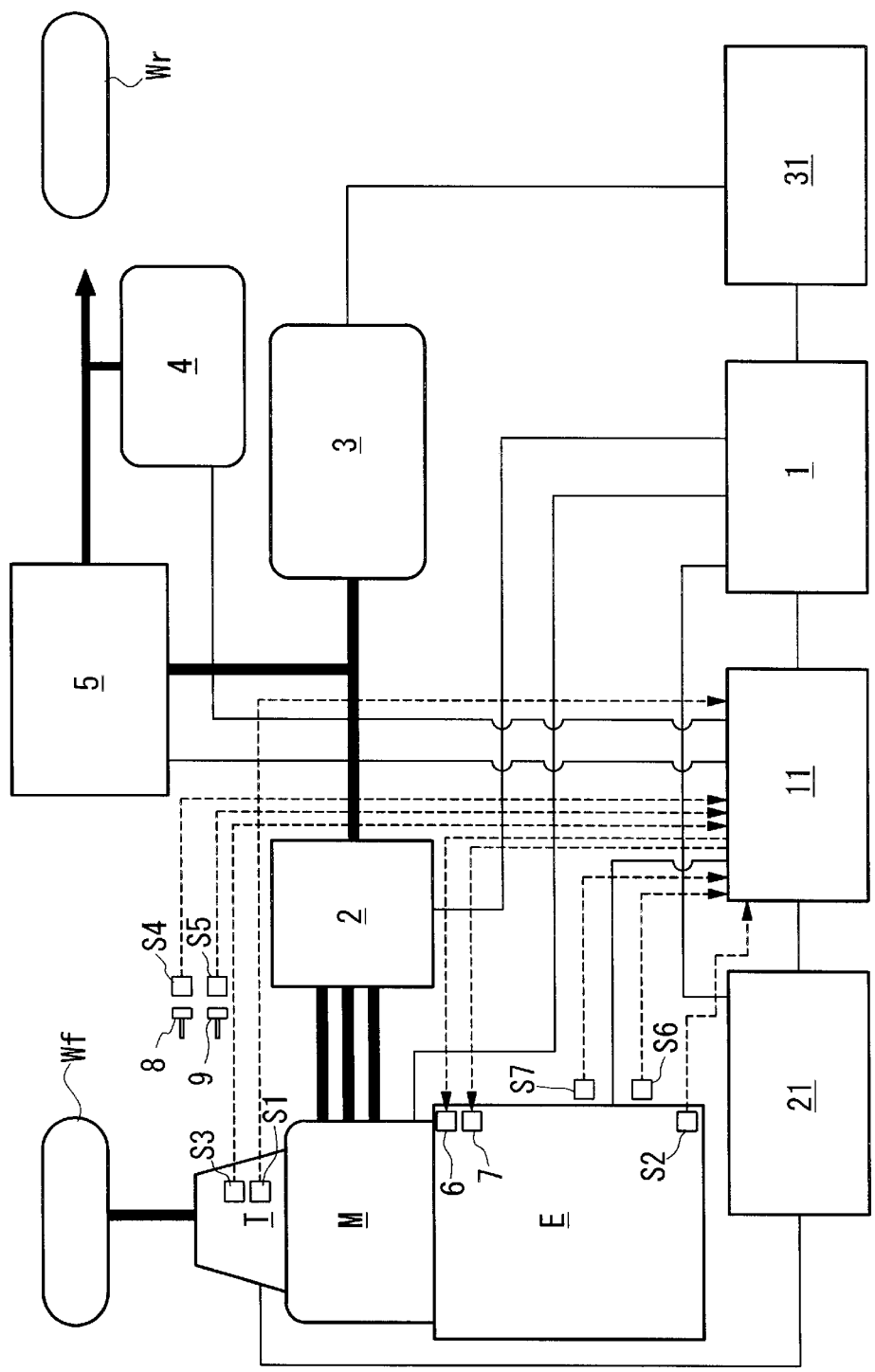
FIG. 1 is a block diagram showing the general structure of the hybrid vehicle in an embodiment according to the present invention.

FIG. 1 is a block diagram illustrating a parallel hybrid vehicle in which the embodiment of the present invention is applied, and the vehicle comprises an engine E and an electric motor M. The driving force generated by both the engine E and electric motor M is transmitted via automatic or manual transmission T to the driving wheels (here, front wheels) Wf. At the time of the deceleration of the hybrid vehicle, the driving force is transmitted from the driving wheels Wf to the electric motor M, the electric motor M functions as a generator for generating what is termed regenerative braking force, that is, the kinetic energy of the vehicle body is recovered and stored as electric energy.

The driving of the motor M and the regenerating operation of the motor M are controlled by a power drive unit 2 according to control commands from a motor ECU 1. A high voltage battery 3 for sending and receiving electric energy to and from the motor M is connected to the power drive unit 2. The battery 3 includes a plurality of modules connected in series, and in each module, a plurality of cells are connected in series. The hybrid vehicle includes a 12-V auxiliary battery 4 for driving various accessories. The auxiliary battery 4 is connected to the battery 3 via a downverter 5. The downverter 5, controlled by an FIECU 11, reduces the voltage from the battery 3 so as to charge the auxiliary battery 4.

The FIECU 11 controls, in addition to the motor ECU 1 and the downverter 5, a fuel supply amount controller 6 for controlling the amount of fuel supplied to the engine E, a starter motor 7, and ignition timing, etc. Therefore, the FIECU 11 receives (i) a signal from a speed sensor S1 for detecting vehicle speed V based on the rotation speed of the drive shaft of transmission T, (ii) a signal from an engine (rotational) speed sensor S2 for detecting engine (rotational) speed NE, (iii) a signal from a shift position sensor S3 for detecting the shift position of the transmission T, (iv) a signal from a brake switch S4 for detecting operation of a brake pedal 8, (v) a signal from a clutch switch S5 for detecting the operation of a clutch pedal 9, (vi) a signal from a throttle opening-degree sensor S6 for detecting the degree of throttle (valve) opening TH, and (vii) a signal from an air-intake passage pressure sensor S7 for detecting the air-intake passage (negative) pressure PB.

In FIG. 1, a CVTECU 21 controls the CVT (continuously variable transmission), a battery ECU 31 protects the battery 3, and calculates the state of charge (remaining battery charge) SOC of the battery 3.

Figure 4:
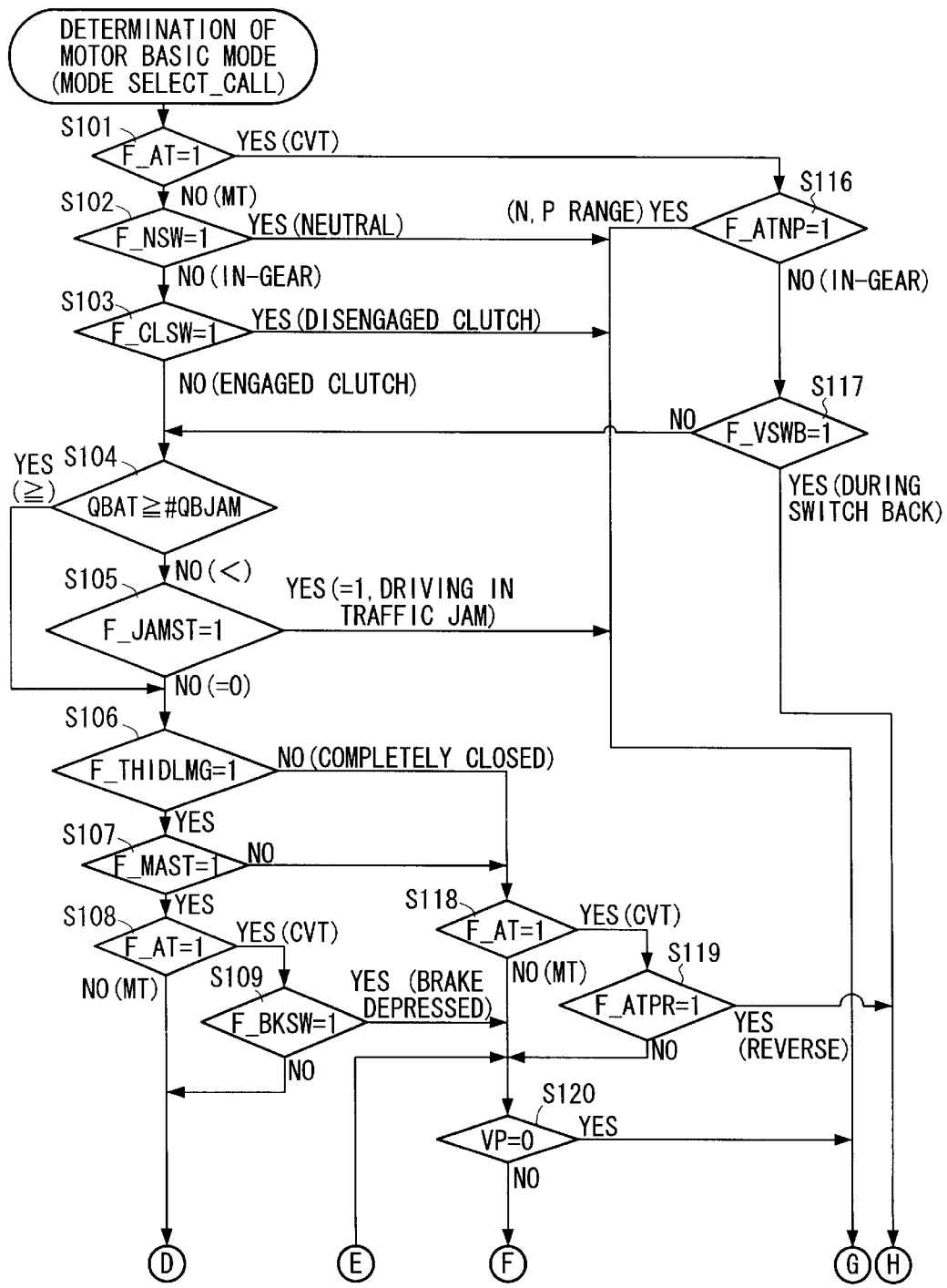
FIG. 4 is a flowchart showing the operation for determining the motor operation mode.
Figure 5:
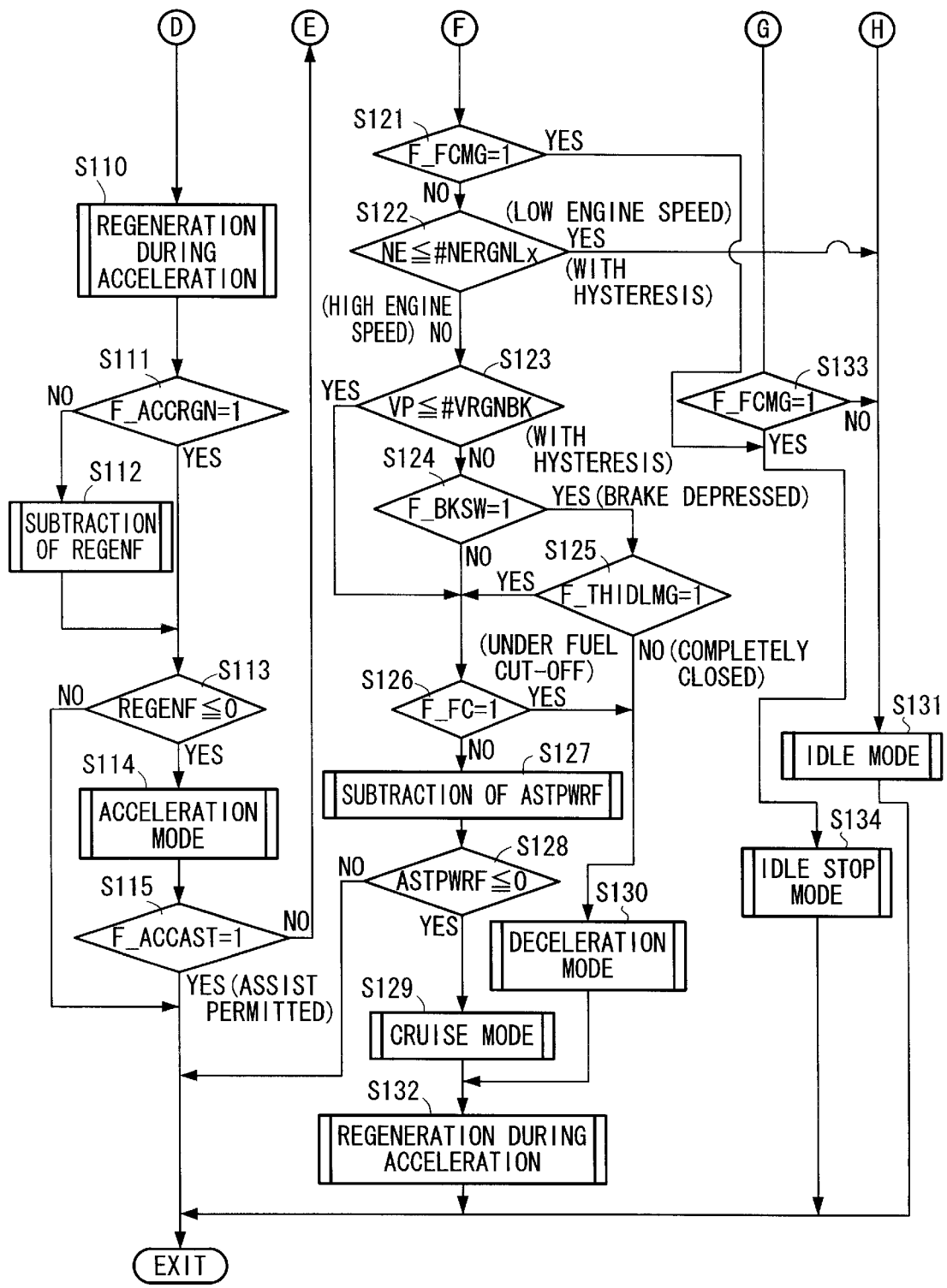
FIG. 5 is also a flowchart showing the operation for determining the motor operation mode.

This hybrid vehicle can enter various control modes, such as an "acceleration mode", a "cruise mode", a "deceleration mode", an "idle stop mode", and an "idle mode". Referring to the flowchart shown in FIGS. 4 and 5, the process for determining the above four motor control modes will be explained.

First, in step S101, it is determined whether the value of flag F__AT is 1. The flag F__AT is provided for determining whether the transmission is CVT (continuous variable transmission) or MT (manual transmission). If the result of the determination in step S101 is "NO", that is, if it is determined that the vehicle employs an MT, the operation proceeds to step S102. If the result of the determination in step S101 is "YES", that is, if it is determined that the vehicle employs a CVT, the operation jumps to step S116, where it is determined whether the value of flag F__ATNP is 1. The flag F__ATNP is provided for determining the in-gear state of CVT. If the result of the determination in step S116 is "NO", that is, if it is determined that the CVT is in the in-gear state, then in step S117, it is further determined whether the value of flag F__VSWB is 1. Here, the flag F__VSWB is provided for determining whether the switch back operation is currently executed (that is, the shift lever is being operated). If the result of the determination in step S117 is "NO", that is, if it is determined that the switch back is currently not being executed, then the operation proceeds to step S104. If the result of the determination in step S117 is "YES", that is, if it is determined that the switch back is currently being executed, then the operation jumps to step S131, where the control mode is switched to the idle mode, and the control operation of this flow is terminated.

If the result of the determination in step S116 is "YES", that is, if it is determined that the CVT is in the N (neutral) or P (parking) range, the operation jumps to step S133, where it is determined whether the value of flag F__FCMG is 1. This flag F__FCMG is provided for determining whether the control of stopping the engine is being performed. If the result of the determination in step S133 is "NO", the operation proceeds to step S131, while if the result of the determination in step S133 is "YES", then the operation proceeds to step S134. In the step S134, control suitable for the idle stop mode is performed, and the control of this flow is completed. In the idle stop mode, the engine is stopped under specific conditions.

In step S102, it is determined whether the value of flag F__NSW is 1. The flag F__NSW is provided for determining whether a neutral position is currently selected. If the result of the determination in step S102 is "YES", that is, if it is determined that a neutral position is currently selected, then the operation jumps to step S133.

If the result of the determination in step S102 is "NO", that is, if it is determined that the current state is the in-gear state, then the operation proceeds to step S103, where it is determined whether the value of flag F__CLSW is 1. The flag F__CLSW is provided for determining whether the clutch is currently disengaged. If the result of the determination is "YES", that is, if it is determined that the clutch is currently disengaged, then the operation jumps to step S133.

If the result of the determination in step S103 is "NO", that is, if it is determined that the clutch is being engaged, then the operation proceeds to step S104. In step S104, it is determined whether the current remaining battery charge (i.e., the current state of charge of the battery) QBAT of battery 3 is equal to or above an upper limit #QBJAM (e.g., 30%) of the remaining battery charge. Here, the upper limit #QBJAM is predetermined for determining whether the determination relating to driving in a traffic jam is executed, and #QBJAM is predetermined in consideration of hysteresis. If the result of the determination is "YES", that is, if the current remaining battery charge QBAT of battery 3 is equal to or above the upper limit #QBJAM of the remaining battery charge, then the operation proceeds to step S106.

If the result of the determination in step S104 is "NO", that is, if the current remaining battery charge QBAT of battery 3 is not equal to or above an upper limit #QBJAM of the remaining battery charge, then the operation proceeds to step S105, where it is determined whether the value of flag F__JAMST is 1. This flag F__JAMST is provided for determining whether the vehicle is driving in a traffic jam. The determination whether the vehicle is driving in a traffic jam will be explained later in detail. If the result of the determination in step S105 is "YES", that is, if it is determined that the vehicle is driving in a traffic jam, then the operation proceeds to step S133. That is, if the remaining battery charge QBAT of battery 3 is below the upper limit #QBJAM, and if it is determined that the vehicle is driving in a traffic jam, then control suitable for the idle or idle stop mode is performed (see steps S131 and S134), so that the operation of outputting force by the motor is prohibited.

If the result of the determination in step S105 is "NO", that is, if it is determined that the vehicle is not driving in a traffic jam, then the operation proceeds to step S106. In step S106, it is determined whether the value of flag F__THIDLMG is 1.

The flag F__THIDLMG is provided for determining the idle state. If the result of the determination is "NO", that is, if it is determined that the degree of throttle opening is minimum (i.e., completely closed), then the operation jumps to step S118. If the result of the determination in step S106 is "YES", that is, if it is determined that the throttle is not completely closed, then the operation proceeds to step S107, where it is determined whether the value of flag F__MAST is 1. This flag F__MAST is provided for determining whether the motor is assisting the motor output.

If the result of the determination in step S107 is "NO", the operation jumps to step S118, while if the result of the determination in step S107 is "YES", then the operation proceeds to step S108.

In step S118, it is determined whether the value of flag F__AT (for determining the MT/CVT) is 1. If the result of the determination is "NO", that is, if it is determined that the present, vehicle employs an MT, then the operation proceeds to step S120. If the result of the determination in step S118 is "YES", that is, if it is determined that the present vehicle employs a CVT, then the operation proceeds to step S119. In step S119, it is determined whether the value of flag F__ATPR is 1. This flag F__ATPR is provided for determining whether the current position of the CVT is a reverse position. If the result of the determination is "YES", that is, if it is determined that the current position is the reverse position, then the operation jumps to step S131. If the result of the determination in step S119 is "NO", that is, if it is determined that the current position is another position, then the operation proceeds to step S120.

In step S108, it is determined whether the value of flag F_AT (for determining the MT/CVT) is 1. If the result of the determination is "NO", that is, if it is determined that the present vehicle employs an MT, then the operation proceeds to step S110, where regeneration operation is executed during acceleration under some conditions. The operation then proceeds, to step S111. In step S111, it is determined whether the value of flag F_ACCRGN is 1. This flag F_ACCRGN is provided for determining whether the regeneration is being executed during acceleration. If the result of the determination is "YES", that is, if it is determined that regeneration is being executed during acceleration, then the operation proceeds to step S113. If the result of the determination in step S111 is "NO", that is, if it is determined that regeneration is not currently executed during acceleration, then the operation proceeds to step S112, where subtraction of a final charge command value REGENF is executed. Here, the final charge command value REGENF indicates the amount of charge to be executed, and value 0 indicates charge is not executed.

The operation then proceeds to step S113, where it is determined whether the final charge command value REGENF is equal to or below 0. If it is determined that the final charge command value REGENF is larger than 0, then the operation of the present flow is completed. If it is determined, in step S113, that the final charge command value REGENF is equal to or below 0, then the operation proceeds to step S114, where control suitable for the acceleration mode is executed. In the next step S115, it is determined whether the value of flag F_ACCAST is 1. This flag F_ACCAST is provided for determining whether the engine assisting operation is permitted. If the result of the determination is "YES", then the operation of this flow is completed. If the result of the determination in step S115 is "NO", that is, if the value of flag F_ACCAST is 0, then the operation proceeds to step S120. Here, in the above acceleration mode, the engine driving operation is assisted by using motor M.

If the result of the determination in step S108 is "YES", that is, if it is determined that the vehicle employs a CVT, then the operation proceeds to step S109, where it is determined whether the value of flag F_BKSW is 1. This flag F_BKSW is provided for determining whether the brake is being depressed. If the result of the determination is "YES", that is, if it is determined that the brake is being depressed, then the operation jumps to step S120. If the result of the determination in step S109 is "NO", that is, if it is determined that the brake is not currently being depressed, then the operation proceeds to step S110.

In step S120, it is determined whether vehicle speed VP (detected for controlling the engine) is 0. If the result of the determination is "YES", that is, if it is determined that the vehicle speed VP is 0, then the operation jumps to step S133. If the result of the determination in step S120 is "NO", that is, if it is determined that the vehicle speed VP is not 0, then the operation proceeds to step S121. In step S121, it is determined whether the value of the flag F_FCMG is 1.

If the result of the determination in step S121 is "NO", then the operation proceeds to step S122. If the result of the determination in step S121 is "YES", that is, if it is determined that the relevant flag value is 1, then the operation jumps to step S134.

In step S122, the engine speed NE is compared with a lower limit engine speed #NERGNLx predetermined for the cruise/deceleration mode. Here, the "x" in #NERGNLx indicates each gear, that is, the lower limit engine speed is predetermined for each gear in consideration of hysteresis.

If it is determined, in step S122, that engine speed NE≦lower limit engine speed #NERGNLx, that is, if it is determined that the engine speed is relatively low, then the operation jumps to step S131. If it is determined, in step S122, that engine speed NE>lower limit engine speed #NERGNLx, that is, if it is determined that the engine speed is relatively high, then the operation proceeds to step S123.

In step S123, it is determined whether the above vehicle speed VP is equal to or below a lower limit vehicle speed #VRGNBK which a predetermined value provided for determining the brake operation in the deceleration mode. If the result of the determination is "YES", then the operation jumps to step S126, while if the result of the determination in step S123 is "NO", then the operation proceeds to step S124.

In step S124, it is determined whether the value of the above-explained flag F_BKSW for determining the brake state is 1. If the result of the determination in step S124 is "YES", that is, if it is determined that the brake is being depressed, then the operation proceeds to step S125. If the result of the determination in step S124 is "NO", that is, if it is determined that the brake is not currently depressed, the operation jumps to step S126.

In step S125, it is determined whether the value of flag F_THIDLMG is 1. As explained above, this flag F_THIDLMG is provided for determining the idle state. If the result of the determination is "NO", that is, if it is determined that the throttle is completely closed, then the operation jumps to step S130 (where the control suitable for the deceleration mode is performed), and in the next step S132, the above-explained regeneration operation, executed under some conditions during acceleration, is performed, and the control operation of this flow is completed. In the deceleration mode, regenerative braking operation using motor M is executed. If the result of the determination in step S125 is "YES", that is, if it is determined that the throttle is not completely closed, then the operation proceeds to step S126.

In step S126, it is determined whether the value of flag F_FC is 1. This flag F_FC is provided for determining whether the fuel cut-off is being executed. If the result of the determination is "YES", that is, if it is determined that the fuel cut-off is being executed, then the operation jumps to step S130. If the result of the determination in step S126 is "NO", then the operation proceeds to step S127, where subtraction of a final assist command value ASTPWRF is performed. Here, the final assist command value ASTPWRF indicates power to provide assistance, and value 0 indicates the assisting operation is not executed. In the next step S128, it is determined whether the final assist command value ASTPWRF is equal to or below 0. If it is determined that ASTPWRF is equal to or below 0, then the operation proceeds to step S129, where control suitable for the cruise mode is performed. In this cruise mode, motor M is not driven, and the vehicle is driven using the driving force of engine E. The operation then jumps to step S132. If it is determined, in step S128, that the final assist command value ASTPWRF is larger than 0, then the control operation of this flow is completed.

Accordingly, (i) if it is determined that the remaining battery charge is below #QBJAM (i.e., "NO" in step S104), and (ii) if the value of flag F_JAMST (for determining whether the vehicle is driving in a traffic jam) is 1 (i.e., "YES" in step S105), then it is determined that the energy charged in battery 3 has decreased due to driving in a traffic jam. Therefore, while the value of flag F_FCMG is 1 under these conditions, the control operation of the idle mode is selected and started so as to charge battery 3.

Determination in Driving in a Traffic Jam

Figure 2:
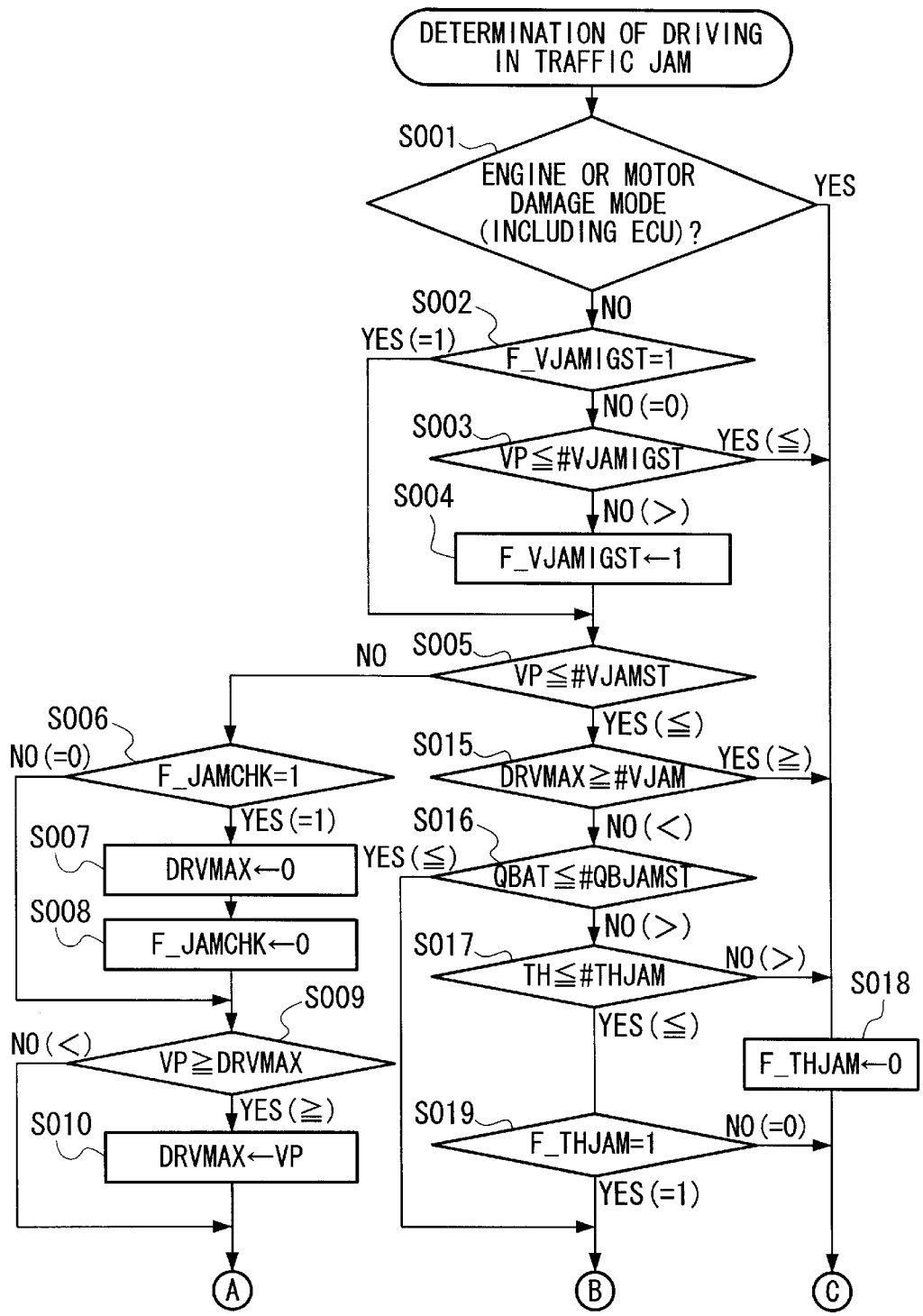
FIG. 2 is a flowchart showing the operation for determining the driving state in a traffic jam.
Figure 3:
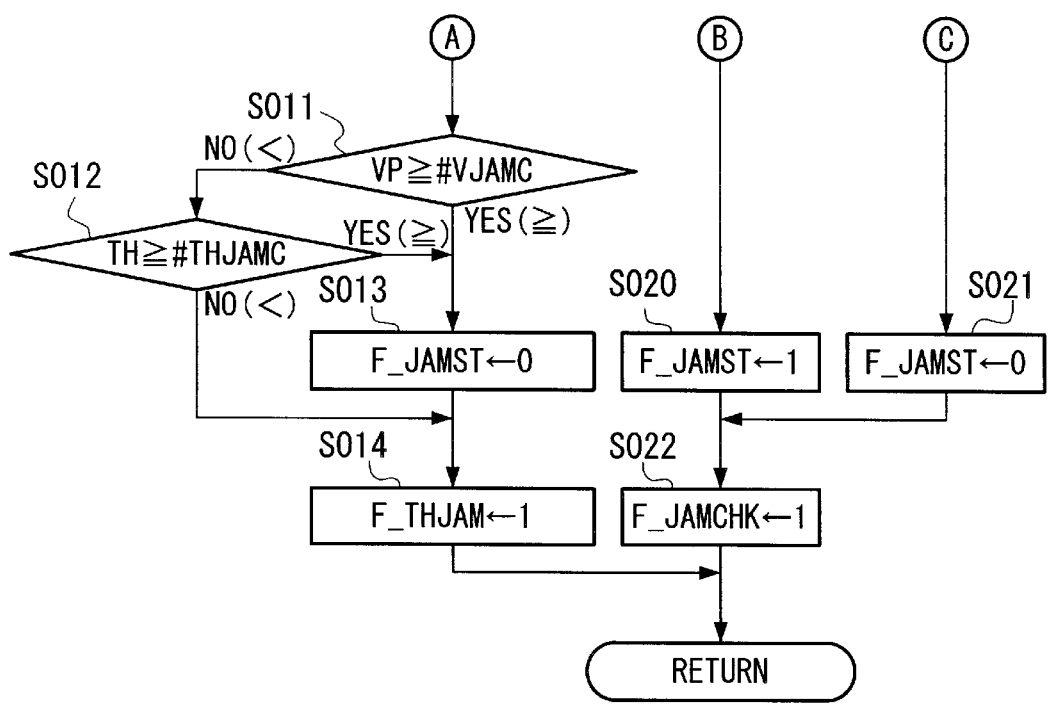
FIG. 3 is also a flowchart showing the operation for determining the driving state in a traffic jam.

With reference to FIGS. 2 and 3, the operation for determining whether the vehicle is driving in a traffic jam will be explained.

First, in step S001, it is determined whether the vehicle is currently in an operation mode relating to a damage of the engine or motor (including the relevant ECU). If the result of the determination is "YES", that is, if it is determined that the vehicle is in such a damage mode of the engine or motor, then the operation jumps to step S018, where the value of flag F_THJAM is set to 0. This flag F_THJAM is provided for indicating the degree of throttle opening (used for determining the driving state in a traffic jam). The operation then proceeds to step S021. In step S021, the value of the flag F_JAMST is set to 0, and the operation proceeds to step S022.

If the result of the determination in step S001 is "NO", that is, if it is determined that the vehicle is not in an operation mode relating to a damage of the engine or motor (including the relevant ECU), then the operation proceeds to step S002. In the step S002, it is determined whether the value of flag F_VJAMIGST is 1 after the ignition is switched on (from the OFF state). Here, the flag F_VJAMIGST is provided for starting the determination of driving in a traffic jam. If the result of the determination is "YES", that is, if it is determined that the value of the flag F_VJAMIGST is 1, then the operation proceeds to step S005.

If the result of the determination in step S002 is "NO", that is, if it is determined that the value of flag F_VJAMIGST is 0, then the operation proceeds to step S003, where it is determined whether the value of the current vehicle speed VP is equal to or below a lower limit vehicle speed #VJAMIGST (e.g., 20 km/h) after the ignition is switched on (from the OFF state). Here, the lower limit vehicle speed #VJAMIGST is predetermined for determining whether the determination about driving in a traffic jam is started. If the result of the determination is "NO", that is, if it is determined that the current vehicle speed VP is larger than #VJAMIGST, then the operation proceeds to step S004.

If the result of the determination in step S003 is "YES", that is, if it is determined that the current vehicle speed VP is equal to or below #VJAMIGST, then the operation jumps to step S018, where the value of the flag F_THJAM for indicating the degree of throttle opening (used for determining driving in a traffic jam) is set to 0. The operation then proceeds to step S021, where the value of the flag F_JAMST (for determining whether the vehicle is driving in a traffic jam) is set to 0. The operation then proceeds to step S022, where the value of flag F_JAMCHK is set to 1. Here, the flag F_JAMCHK is provided for indicating the execution of the determination about driving in a traffic jam.

In step S004, the value of the flag F_VJAMIGST is set to 1, then the operation proceeds to step S005, where it is determined whether the current vehicle speed VP is equal to or below an upper value #VJAMST (e.g., 5 km/h). This upper value #VJAMST is a predetermined value provided for executing the determination about driving in a traffic jam, and this value is predetermined in consideration of hysteresis. If the result of the determination is "YES", that is, if the current vehicle speed VP is equal to or below the upper value #VJAMST, then the operation proceeds to step S015. The set value 1 of flag F_VJAMIGST (set in step S004) is maintained until the ignition is switched off.

If the result of the determination in step S005 is "NO", that is, if the current vehicle speed VP is larger than the upper value #VJAMST, then the operation proceeds to step S006, where it is determined whether the value of flag F_JAMCHK (for indicating the execution of the determination about driving in a traffic jam) is 1. If the result of the determination is "NO", that is, if it is determined that the value of flag F_JAMCHK is 0, then the operation proceeds to step S009.

If the result of the determination in step S006 is "YES", that is, if it is determined that the value of the flag F_JAMCHK is 1, then the operation proceeds to step S007, where a maximum vehicle speed DRVMAX during a single driving operation (or mevement) from start to stop is set to 0. The operation then proceeds to step S008. In step S008, the value of flag F_JAMCHK (for executing the determination about driving in a traffic jam) is set to 0, then the operation proceeds to step S009.

In step S009, it is determined whether the current vehicle speed is equal to or above the maximum vehicle speed DRVMAX during a single driving operation from start to stop. If the result of the determination is "NO", that is, if the current vehicle speed is smaller than the maximum vehicle speed DRVMAX (during a single driving operation), then the DRVMAX is not updated and the operation proceeds to step S011.

If the result of the determination in step S009 is "YES", that is, if the current vehicle speed VP is equal to or above the maximum vehicle speed DRVMAX (during a single driving operation), then the operation proceeds to step S010, where the DRVMAX is set to the current vehicle speed VP and the operation proceeds to step S011.

In step S011, it is determined whether the current vehicle speed VP is equal to or above a lower limit vehicle speed #VJAMC (e.g., 20 km/h) for determining whether the vehicle is in a normally driving state. If the result of the determination is "YES", that is, if the current vehicle speed VP is equal to or above the lower limit vehicle speed #VJAMC, then the operation proceeds to step S013.

If the result of the determination in step S011 is "NO", that is, if the current vehicle speed VP is below the lower limit vehicle speed #VJAMC, then the operation proceeds to step S012. In the step S012, it is determined whether the current degree TH of throttle opening is equal to or above a lower limit degree #THJAMC (e.g., 20 degrees) of throttle opening in normal driving. If the result of the determination is "NO", that is, if the current degree TH of throttle opening is below the lower limit degree #THJAMC, then the operation proceeds to step S014.

If the result of the determination in step S012 is "YES", that is, if the current degree TH of throttle opening is equal to or above the lower limit degree #THJAMC of throttle opening in normal driving, then the operation proceeds to step S013. In step S013, the value of the flag F_JAMST is set to 0, then the operation proceeds to step S014. In the step S014, the value of the above-explained flag F_THJAM is set to 1. The operation of this flow is then completed.

If the result of the determination in step S005 is "YES", that is, if the current vehicle speed VP is equal to or below #VJAMST, then the operation proceeds to step S015. In the step S015, it is determined whether the above-explained maximum vehicle speed DRVMAX (during a single driving operation from start to stop) is equal to or above an upper limit vehicle speed #VJAM (e.g., 18 km/h) for determining driving in a traffic jam. If the result of the determination is "YES", that is, if the maximum vehicle speed DRVMAX is equal to or above the upper limit vehicle speed #VJAM for determining driving in a traffic jam, then the operation proceeds to step S018.

If the result of the determination in step S015 is "NO", that is, if the maximum vehicle speed DRVMAX is not equal to or above the upper limit vehicle speed #VJAM, more specifically, if the vehicle drives at a speed by which the vehicle may be driving in a traffic jam, then the operation proceeds to step S016. In the step S016, it is determined whether the current remaining battery charge QBAT is equal to or below a predetermined value #QBJAMST (e.g., 18%). This value #QBJAMST is predetermined in consideration of hysteresis. If the result of the determination is "YES", that is, if the current remaining battery charge QBAT is equal to or below the predetermined value #QBJAMST, then the operation proceeds to step S020.

If the result of the determination in step S016 is "NO", that is, if the current remaining battery charge QBAT is larger than the predetermined value #QBJAMST, then the operation proceeds to step S017. In the step S017, it is determined whether the current degree TH of throttle opening is equal to or below an upper limit degree THJAM (e.g., 20 degrees) of throttle opening for determining driving in a traffic jam. If the result of the determination is "NO", that is, if the current degree TH of throttle opening is above the upper limit degree THJAM, then the operation proceeds to step S018.

If the result of the determination in step S017 is "YES", that is, if—the current degree TH of throttle opening is equal to or below the above upper limit degree THJAM, then the operation proceeds to step S019, where the value of the flag F_THJAM (for indicating the degree of throttle opening used for determining the driving state in a traffic jam) is set to 1. The operation then proceeds to step S020, where the value of flag F_JAMST is set to 1, and then the operation proceeds to step S022.

Therefore, if the maximum vehicle speed DRVMAX (during a single driving operation) is smaller than #VJAM, and if the degree of throttle opening is equal to or below #THJAM, then it is estimated that the vehicle is driving in a traffic jam. In this case, the value of flag F_JAMST (for determining the driving state in a traffic jam) is set to 1 so as to prevent unnecessarily consumption of the power (i.e., energy) charged in battery 3 while driving in a traffic jam.

Additionally, when the maximum vehicle speed DRVMAX (during a single driving operation) is smaller than #VJAM, if the remaining battery charge of battery 3 is equal to or below #QBJAMST (corresponding to the second predetermined value in the present invention), too much of the remaining battery charge of battery 3 has been consumed. Therefore, in this case, the determination about driving in a traffic jam is performed by only referring to the vehicle speed, and the value of flag F_JAMST is set to 1 so as to immediately regain the charged energy.

Idle Mode

Figure 6:
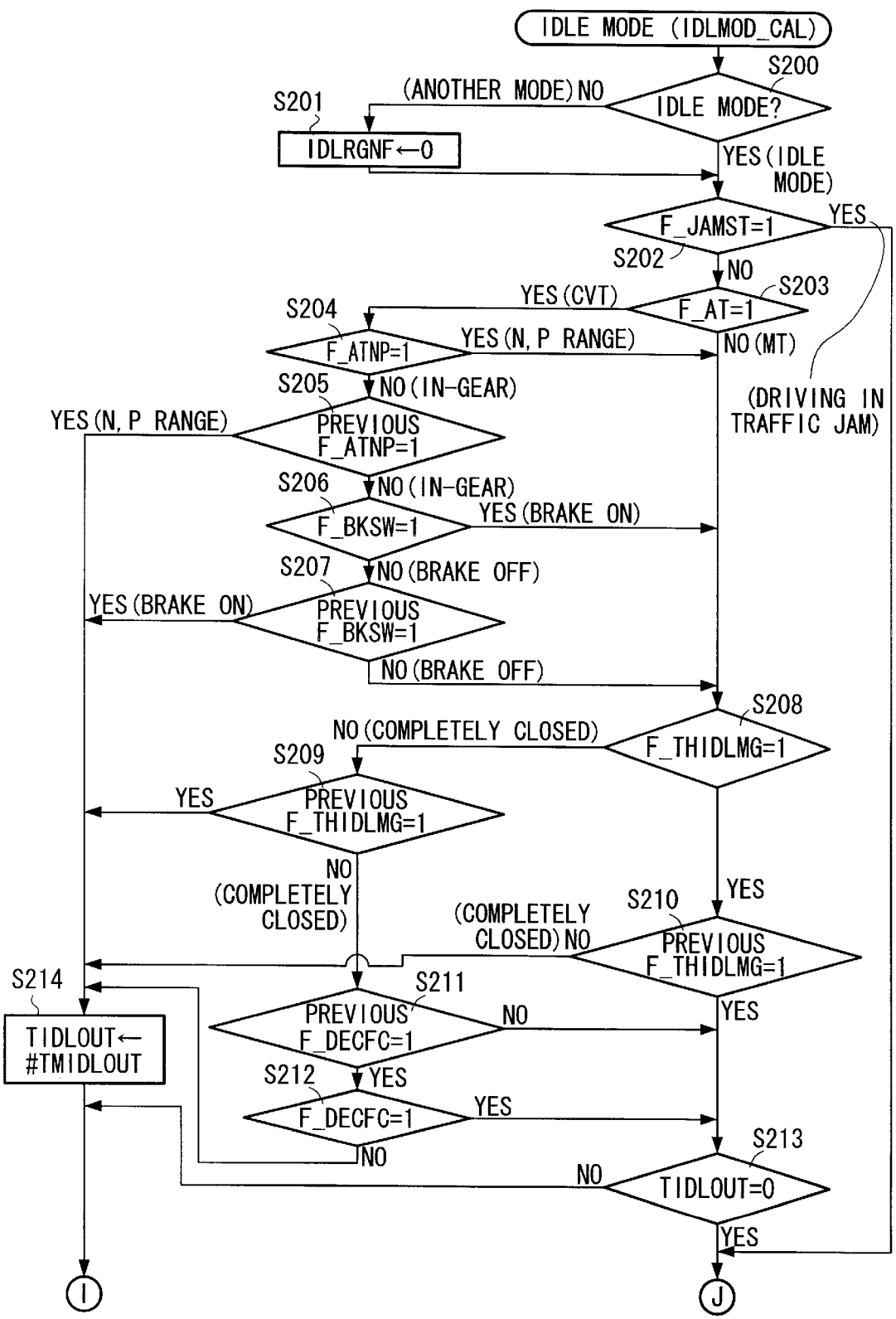
FIG. 6 is a flowchart showing the operation of the idle mode.
Figure 7:
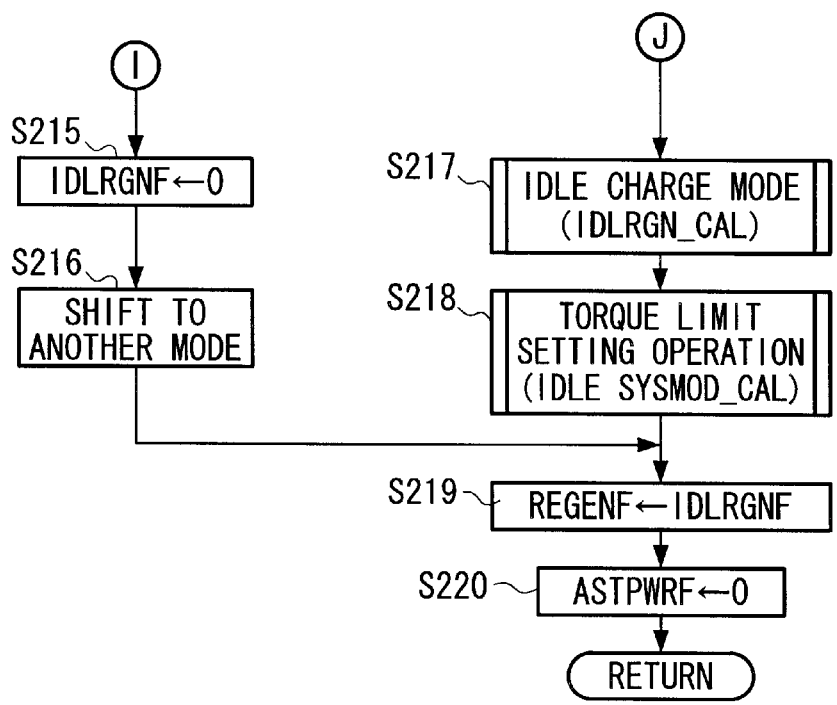
FIG. 7 is also a flowchart showing the operation of the idle mode.

Below, the control of the idle mode will be explained with reference to the flowchart shown in FIGS. 6 and 7.

In step S200, it is determined whether the current mode is the idle mode. If it is determined that the current mode is the idle mode, then the operation proceeds to step S202. If it is determined, in step S200, that the current mode is another mode, then in step S201, a final idle charge command value IDLRGNF is set to 0, and the operation proceeds to step S202. Accordingly, if the idle mode starts by shifting from another mode (other than the idle mode), the initial amount of the idle charge (i.e., the charge operation in the idle mode) is set to 0.

In step S202, it is determined whether the value of the flag F_JAMST for determining the driving state in a traffic jam is 1. If the result of the determination is "YES", that is, if it is determined that the vehicle is driving in a traffic jam, then the operation proceeds to step S217, where the control suitable for the idle charge is performed (detailed operation will be later explained). The amount of idle charge is calculated in the idle charge mode in step S217, then the operation proceeds to step S218. In step S218, a torque limit setting operation is performed. In this torque limit setting operation, the upper limit of the torque imposed on the engine is determined so as not to make the engine stall due to the idle charge.

If the result of the determination in step S202 is "NO", that is, if it is determined that the vehicle is not driving in a traffic jam, then the operation proceeds to step S203, where it is determined whether the value of the flag F_AT is 1. If the result of the determination is "NO", that is, if it is determined that the vehicle employs an MT, then the operation jumps to step S208. If the result of the determination in step S203 is "YES", that is, if it is determined that the vehicle employs a CVT, then the operation proceeds to step S204. In step S204, it is determined whether the value of the flag F_ATNP (for determining the in-gear state of CVT) is 1.

If the result of the determination in step S204 is "YES", that is, if it is determined that the CVT is in the N or P range, then the operation jumps to step S208. If the result of the determination in step S204 is "NO", that is, if it is determined that the CVT is in the in-gear state, then in the next step S205, it is determined whether the previous value of the above flag F_ATNP, that is, the flag value in the last (operation) turn of this flow is 1. If the result of the determination is "YES", that is, if it was determined in the last turn that the CVT was in the N or P range, then the operation jumps to step S214.

In step S214, the timer value of a non-idle mode selecting timer TIDLOUT for maintaining the non-idle state for a predetermined time is set to a predetermined value #TMIDLOUT. The operation then proceeds to step S215, where the final idle charge command value IDLRGNF is set to 0. In the next step S216, the mode is shifted to another mode (other than the idle mode), and in step S219, the final charge command value REGENF is set to the final idle charge command value IDLRGNF, and in the following step S220, the final assist command value ASTPWRF is set to 0. The control operation of this flow is then completed.

If the result of the determination in step S205 is "NO", that is, if it was determined in the last turn that the CVT was in the in-gear state (in the last turn), then in the next step S206, it is determined whether the value of the flag F_BKSW is 1. If the result of the determination is "YES", that is, if it is determined that the brake is being depressed, then the operation proceeds to step S208. If the result of the determination in step S206 is "NO", that is, if it is determined that the brake is not currently being depressed, then the operation proceeds to step S207.

In step S207, it is determined whether the previous value of flag F_BKSW (i.e., the flag value in the last turn) is 1. If the result of the determination in step S207 is "YES", that is, if it was also determined that the brake was being depressed, then the operation jumps to step S214. If the result of the determination in step S207 is "NO", that is, if it was determined in the last turn that the brake was not being depressed, then the operation proceeds to step S208.

In step S208, it is determined whether the value of the above-explained flag F_THIDLMG is 1. If the result of the determination is "NO", that is, if it is determined that the throttle is completely closed, then the operation proceeds to step S209. If the result of the determination in step S208 is "YES", that is, if it is determined that the throttle is not completely closed, then the operation proceeds to step S210. In step S209, it is determined whether the previous value of the flag F_THIDLMG in the last turn is 1. If the result of the determination is "NO", that is, if it was determined in the last turn that the throttle was completely closed, the operation proceeds to step S211. If the result of the determination in step S209 is "YES", that is, if it was determined in the last turn that the throttle was not completely closed, then the operation jumps to step S214.

Also in step S210, it is determined whether the previous value of the flag F_THIDLMG in the last turn is 1. If the result of the determination is "NO", that is, if it was determined in the last turn that the throttle was completely closed, the operation proceeds to step S214. If the result of the determination in step S210 is "YES", that is, if it was determined in the last turn that the throttle was not completely closed, then the operation jumps to step S213. In step S211, it is determined whether the previous value of flag F_DECFC is 1. This flag F_DECFC is provided for determining whether the fuel cut-off is being executed during deceleration. If the result of the determination is "YES", that is, if the flag value is 1, then in the next step S212, it is determined whether the current value of the flag F_DECFC is 1. If the result of the determination in step S211 is "NO", that is, if the flag value is 0, then the operation proceeds to step S213.

If the result of the determination in step S212 is "YES", that is, if the relevant flag value is 1, then the operation proceeds to step S213. If the result of the determination in step S212 is "NO", that is, if the relevant flag value is 0, then the operation proceeds to step S214.

In step S213, it is determined whether the non-idle mode selecting timer TIDLOUT is 0. If the result of the determination is "YES", the operation proceeds to step S217. If the result of the determination in step S213 is "NO", then the operation proceeds to step S215.

Accordingly, If the value of flag F_JAMST is 1, the battery 3 can be immediately and reliably charged in the idle charge mode without performing other determination processes included in the idle mode.

Idle Charge Mode

Figure 8:
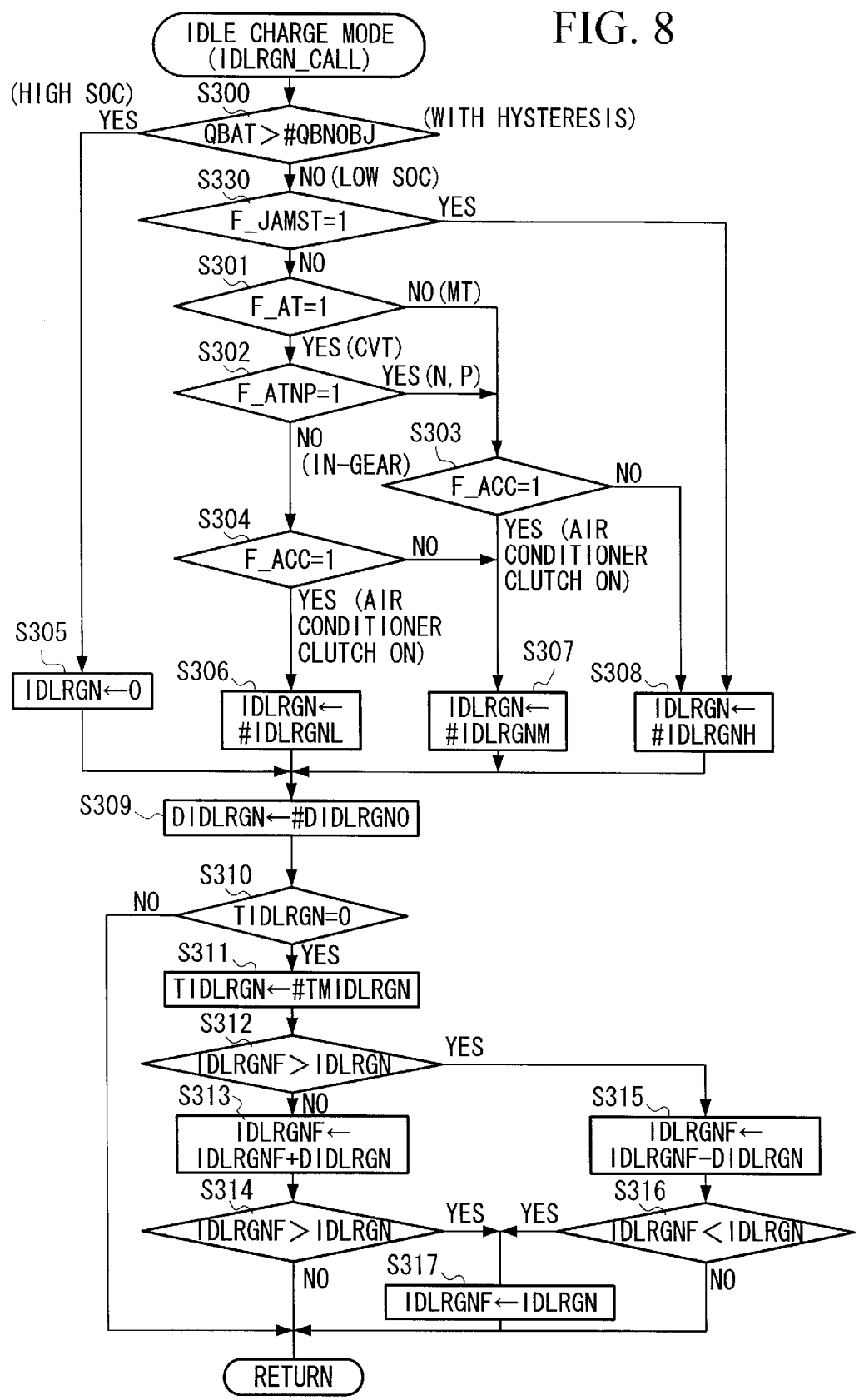
FIG. 8 is a flowchart showing the operation of the idle charge mode.

Below, the control of the idle charge mode will be explained with reference to the flowchart in FIG. 8.

First, in step S300, it is determined whether the current SOC (i.e., remaining battery charge) QBAT is larger than a target value #QBNOBJ. This target value #QBNOBJ is predetermined in consideration of hysteresis. If the result of the determination is "YES", that is, if the current SOC QBAT is large, then the operation proceeds to step S305, where an amount IDLRGN of the idle charge is set to 0. The operation then proceeds to step S309.

If the result of the determination in step S300 is "NO", that is, if the current SOC QBAT is low, then the operation proceeds to step S330, where it is determined whether the value of flag F_JAMST is 1. If the result of the determination in step S330 is "YES", that is, if it is determined that the vehicle is driving in a traffic jam, then the operation jumps to step S308 (explained later).

If the result of the determination in step S330 is "NO", then the operation proceeds to step S301, where it is determined whether the value of the flag F_AT is 1. If the result of the determination is "NO", that is, if it is determined that the vehicle employs an MT, then the operation jumps to step S303.

If the result of the determination in step S301 is "YES", that is, if it is determined that the vehicle employs a CVT, then the operation proceeds to step S302. In step S302, it is determined whether the value of the flag F_ATNP (for determining the in-gear state of CVT) is 1. If the result of the determination in step S302 is "YES", that is, if it is determined that the CVT is in the N or P range, then the operation proceeds to step S303.

If the result of the determination in step S302 is "NO", that is, if the CVT is in the in-gear state, then in the next step S304, it is determined whether the value of flag F_ACC is 1. This flag F_ACC is provided for determining whether the air conditioner clutch (switch) is on. If the result of the determination is "NO", that is, if the air conditioner clutch is off, then the operation proceeds to step S307.

If the result of the determination in step S304 is "YES", that is, if the air conditioner clutch is on, then the operation proceeds to step S306, where the amount DLRGN of the idle charge is set to a low-mode value #IDLRGNL of the idle charge (i.e., set to a low charge level). The operation then proceeds to step S309.

In step S303, it is determined whether the value of the flag F_ACC is 1. If the result of the determination is "YES", that is, if the air conditioner clutch is on, then the operation proceeds to step S307, where the amount IDLRGN of the idle charge is set to a middle-mode value #IDLRGNM of the idle charge (i.e., set to a middle charge level). The operation then proceeds to step S309.

If the result of the determination in step S303 is "NO", that is, if the air conditioner clutch is off, then the operation proceeds to step S308, where the amount IDLRGN of the idle charge is set to a high-mode value #IDLRGNH of the idle charge (i.e., set to a high charge level). The operation then proceeds to step S309. Also when the result of the above step S330 is "YES", then the amount IDLRGN of the idle charge is set to the high-mode value #IDLRGNH of the idle charge (i.e., set to a high charge level).

In step S309, a very small amount DIDLRGN of the idle charge is set to a predetermined small value #DIDLRGNO of the idle charge, then the operation proceeds to step S310. In step S310, it is determined whether an idle charge timer value TIDLRGN is 0. If the result of the determination is "NO", that is, if the idle charge timer value TIDLRGN is not 0, the operation of this flow is completed.

If the result of the determination in step S310 is "YES, that is, if the idle charge timer value TIDLRGN is 0, then the operation proceeds to step S311, where the idle charge timer value TIDLRGN is set to a predetermined small delay-timer value #TMIDLRGN of the idle charge, then the operation proceeds to step S312. In step S312, it is determined whether the above-explained final idle charge command value IDLRGNF is larger than the amount IDLRGN of the idle charge. If the result of the determination is "YES", that is, if the final idle charge command value IDLRGNF is larger than the amount IDLRGN of the idle charge, then the operation proceeds to step S315.

If the result of the determination in step S312 is "NO", that is, if the final idle charge command value IDLRGNF is equal to or below the amount IDLRGN of the idle charge, then the operation proceeds to step S313, where the value of the very small amount DIDLRGN of the idle charge is added to the final idle charge command value IDLRGNF, then the operation proceeds to step S314.

In step S314, it is determined whether the final idle charge command value IDLRGNF is larger than the amount IDLRGN of the idle charge. If the result of the determination is "YES", that is, if the final idle charge command value IDLRGNF is larger than the amount IDLRGN of the idle charge, then the operation proceeds to step S317.

If the result of the determination in step S314 is "NO", that is, if the final idle charge command value IDLRGNF is equal to or below the amount IDLRGN of the idle charge, then the operation of this flow is completed.

In step S315, the value of the very small amount DIDLRGN of the idle charge is subtracted from the final idle charge command value IDLRGNF, then the operation proceeds to step S316. In the step S316, it is determined whether the final idle charge command value IDLRGNF is below the amount IDLRGN of the idle charge. If the result of the determination is "NO", that is, if the final idle charge command value IDLRGNF is equal to or above the amount IDLRGN of the idle charge, then this idle charge operation of this flow is completed.

If the result of the determination in step S316 is "YES", then the operation proceeds to step S317, where the final idle charge command value IDLRGNF is set to the value of the amount IDLRGN of the idle charge, then the idle charge operation of this flow is completed.

According to the above embodiment, when the remaining battery charge is below #QBJAM, if the maximum vehicle speed DRVMAX (during a single driving operation from start to stop) is below #VJAM, and if the degree of throttle opening is equal to or below #THJAM, then it is estimated that the energy charged in battery 3 has been reduced while the vehicle was driving in a traffic jam. Therefore, in order to charge battery 3, the operation of the idle charge mode, which is a sub routine in the operation of the idle mode, is executed.

On the other hand, when the remaining battery charge is equal to or below #QBJAMST, if the maximum vehicle speed DRVMAX is below #VJAM, then it is estimated that the energy charged in battery 3 has been reduced while the vehicle was driving in a traffic jam. Therefore, in order to charge battery 3, the operation of the idle charge mode, which is a sub routine in the operation of the idle mode, is executed regardless of the degree of throttle opening.

In addition, if the remaining battery charge of the battery device is below a predetermined value, and if it is determined that the vehicle is driving in a traffic jam, the motor assisting operation for assisting the engine output may be restricted (i.e., a lower assist level) by setting a higher threshold value which is provided for determining whether the assisting operation is started.

An embodiment of the present invention has been explained with reference to the drawings, but the present invention is not limited to the embodiment, and any design modification or variation is possible within the scope and spirit of the present invention.

What is claimed is:

1. A control system of a hybrid vehicle, wherein said hybrid vehicle comprises an engine and a motor for outputting force for driving the vehicle, a battery device, and a charging device for charging the battery device, said control system comprising:
   a remaining battery charge detecting section for detecting the remaining battery charge of the battery device;
   a traffic jam drive determining section for determining whether the vehicle is driving in a traffic jam; and
   a control section for making the charging device charge the battery device when the remaining battery charge of the battery device, detected by the remaining battery charge detecting section, is below a first predetermined value, and when it is determined by the traffic jam drive determining section that the vehicle is driving in a traffic jam,
   wherein the traffic jam drive determining section comprises:
   a maximum speed detecting section for detecting a maximum vehicle speed during a single driving operation from the vehicle start to stop; and
   a throttle opening-degree detecting section for detecting a degree of throttle opening of the engine,
   wherein the traffic jam drive determining section determines that the vehicle is driving in a traffic jam when the maximum vehicle speed during a single driving operation is equal to or below a predetermined value, and when the degree of throttle opening is equal to or below a predetermined value.

2. A control system of a hybrid vehicle, wherein said hybrid vehicle comprises an engine and a motor for outputting force for driving the vehicle, a battery device, and a charging device for charging the battery device, said control system comprising:
   a remaining battery charge detecting section for detecting the remaining battery charge of a battery device;
   a traffic jam drive determining section for determining whether the vehicle is driving in a traffic jam; and
   a control section for making the charging device charge the battery device when the remaining battery charge of the battery device, detected by the remaining battery charge detecting section, is below a first predetermined value, and when it is determined by the traffic jam drive determining section that the vehicle is driving in a traffic jam,
   wherein the traffic jam drive determining section comprises:
   a maximum speed detecting section for detecting a maximum vehicle speed during a single driving operation from the vehicle start to stop,
   wherein the traffic jam drive determining section determines that the vehicle is driving in a traffic jam when the maximum vehicle speed during a single driving operation is equal to or below a predetermined value, and when the remaining battery charge of the battery device, detected by the remaining battery charge detected section, is equal to or below a second predetermined value which is smaller than the first predetermined value.

3. A control system as claimed in either one of claim 1 or claim 2, wherein after the traffic jam drive determining section determines that the vehicle is driving in a traffic jam, the traffic jam drive determination is released when the vehicle speed becomes equal to or above a predetermined value, or when the vehicle speed is below a predetermined value and the degree of throttle opening becomes equal to or above a predetermined value.

4. A control system as claimed in claim 1,
   wherein the motor also functions as the charging device, and
   wherein the battery device stores energy generated using the motor as a generator driven by the engine, and energy regenerated via a regenerating operation performed by the motor when the vehicle is decelerated.

5. A control system as claimed in claim 1, wherein the control section sets the amount of the charge performed by the charging device to a high charge level when the remaining battery charge is below the first predetermined value, and when it is determined that the vehicle is driving in a traffic jam.

6. A control method of a hybrid vehicle, wherein said hybrid vehicle comprises an engine and a motor for outputting force for driving the vehicle, a battery device, and a charging device for charging the battery, said control method comprising the steps of:

detecting the remaining battery charge of the battery device;

determining whether the vehicle is driving in a traffic jam; and making the charging device charge the battery device when the detected remaining battery charge of the battery device is below a first predetermined value, and when it is determined that the vehicle is driving in a traffic jam, wherein the steps of determining whether the vehicle is driving in a traffic jam comprises the steps of:

detecting a maximum vehicle speed during a single driving operation from the vehicle start to stop;

detecting a degree of throttle opening of the engine; and determining that the vehicle is driving in a traffic jam when the maximum vehicle speed during a single driving operation is equal to or below a predetermined value, and when the degree of throttle opening is equal to or below a predetermined value.

7. A control method of a hybrid vehicle, wherein said hybrid vehicle comprises an engine and a motor for outputting force for driving the vehicle, a battery device, and a charging device for charging the battery, said control method comprising the steps of:

detecting the remaining battery charge of the battery device;

determining whether the vehicle is driving in a traffic jam; and making the charging device charge the battery device and prohibiting operation of outputting force by the motor when the detected remaining battery charge of the battery device is below a first predetermined value, and when it is determined that the vehicle is driving in a traffic jam, wherein the step of determining whether the vehicle is driving in a traffic jam comprises the steps of:

detecting a maximum vehicle speed during a single driving operation from the vehicle start to stop; and determining that the vehicle is driving in a traffic jam when the maximum vehicle speed during a single driving operation is equal to or below a predetermined value, and when the detected remaining battery charge of the battery device is equal to or below a second predetermined value which is smaller than the first predetermined value.

8. A control method as claimed in one of claim 6 or claim 7, wherein after it is determined that the vehicle is driving in a traffic jam, the traffic jam drive determination is released when the vehicle speed becomes equal to or above a predetermined value, or when the vehicle speed is below a predetermined value and the degree of throttle opening becomes equal to or above a predetermined value.

9. A control method as claimed in either one of claim 6 or claim 7, wherein the motor also functions as the charging device; and wherein the battery device stores energy generated using the motor as a generator driven by the engine, and the energy via a generating operation performed by the motor when the vehicle is decelerated.

10. A control method as claimed in either one of claim 6 or claim 7, wherein the amount of the charge performed by the charging device is set to a high charge level when the remaining battery charge is below the first predetermined value, and when it is determined that the vehicle is driving in a traffic jam.

11. A control system as claimed in claim 1, wherein the control section prohibits the operation of outputting force by the motor when the remaining battery charge is below the first predetermined value, and when it is determined that the vehicle is driving in a traffic jam.

12. A control system as claimed in claim 1, wherein the control section restricts the operation of outputting force by the motor when the remaining battery charge is below the first predetermined value, and when it is determined that the vehicle is driving in a traffic jam.

13. A control method as claimed in claim 6, wherein the operation of outputting force by the motor is prohibited when the detected remaining battery charge of the battery device is below the first predetermined value, and when it is determined that the vehicle is driving in a traffic jam.

14. A control method as claimed in claim 6, wherein the operation of outputting force by the motor is restricted when the remaining battery charge is below the first predetermined value, and when it is determined that the vehicle is driving in a traffic jam.

* * * * *